United States Patent
Zhang et al.

(10) Patent No.: US 7,773,999 B2
(45) Date of Patent: Aug. 10, 2010

(54) METHOD AND APPARATUS FOR IDENTIFYING AND REPORTING NON-OPERATIONAL ENHANCED UPLINK SIGNALING CHANNELS

(75) Inventors: Guodong Zhang, Farmingdale, NY (US); Stephen E. Terry, Northport, NY (US); Stephen G. Dick, Nesconset, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 545 days.

(21) Appl. No.: 11/095,070

(22) Filed: Mar. 31, 2005

(65) Prior Publication Data

US 2005/0243767 A1    Nov. 3, 2005

Related U.S. Application Data

(60) Provisional application No. 60/566,700, filed on Apr. 30, 2004.

(51) Int. Cl.
*H04W 72/00* (2009.01)
*H04W 4/00* (2009.01)

(52) U.S. Cl. .................. 455/452.2; 370/329

(58) Field of Classification Search ............. 370/329, 370/328, 338; 455/450, 452.2, 446, 443, 455/444, 451, 452.1, 453
See application file for complete search history.

(56) References Cited

U.S. PATENT DOCUMENTS

| | | | |
|---|---|---|---|
| 6,330,447 B1 * | 12/2001 | Hengeveld | 455/436 |
| 6,729,929 B1 * | 5/2004 | Sayers et al. | 455/446 |
| 7,330,440 B1 * | 2/2008 | Bryant et al. | 370/254 |
| 2001/0034228 A1 * | 10/2001 | Lehtovirta et al. | 455/424 |
| 2003/0103476 A1 * | 6/2003 | Choi et al. | 370/329 |
| 2003/0198228 A1 * | 10/2003 | Shen | 370/395.2 |
| 2003/0219037 A1 * | 11/2003 | Toskala et al. | 370/496 |

OTHER PUBLICATIONS

3GPP2 C.S0002-C, "Physical Layer Standard for cdma2000 Spread Spectrum Systems", $3^{rd}$ Generation Partnership Project 2 "3GPP2", Version 2.0, Revision C, Jul. 23, 2004.

3GPP2 C.20003-C, "Medium Access Control (MAC) Standard for cdma2000 Spread Spectrum Systems", $3^{rd}$ Generation Partnership Project 2 "GPP2", Version 2.0, Release C, Aug. 2004.

(Continued)

*Primary Examiner*—George Eng
*Assistant Examiner*—Christopher M Brandt
(74) *Attorney, Agent, or Firm*—Volpe and Koenig PC

(57) ABSTRACT

A method and apparatus for identifying and reporting a non-operational enhanced uplink (EU) signaling channel. A wireless transmit/receive unit (WTRU) sends a channel allocation request for an enhanced dedicated channel (E-DCH) to a Node-B through an uplink (UL) EU signaling channel. In response to the request, the Node-B sends channel allocation information to the WTRU through one or more downlink (DL) EU signaling channels. If the WTRU does not receive the channel allocation information before a predetermined time period established by a request response timer expires, the WTRU reports a non-operational EU signaling channel to a radio network controller (RNC) via the Node-B. The Node-B reports a non-operational EU signaling channel when the Node-B does not receive E-DCH data transmissions after sending the channel allocation information, or receives subsequent E-DCH data transmissions which are inconsistent with the channel allocation information.

8 Claims, 3 Drawing Sheets

OTHER PUBLICATIONS

3GPP2 C.S0004-C, "Signaling Link Access Control (LAC) Standard for cdma2000 Spread Spectrum Systems", $3^{rd}$ Generation Partnership Project 2 "3GPP2", Version 2.0, Revision C, Jul. 23, 2004.

3GPP2 C.S0005-C, "Upper Layer (Layer 3) Signaling Standard for cdma2000 Spread Spectrum Systems", $3^{rd}$ Generation Partnership Project 2 "3GPP2", version 2.0, Revision c, Jul. 23, 2004.

* cited by examiner

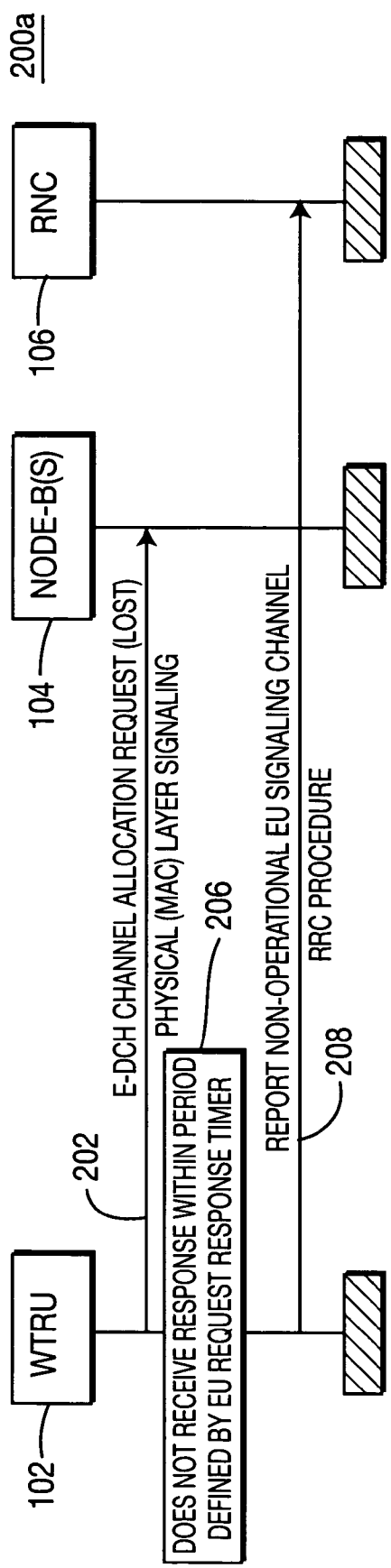
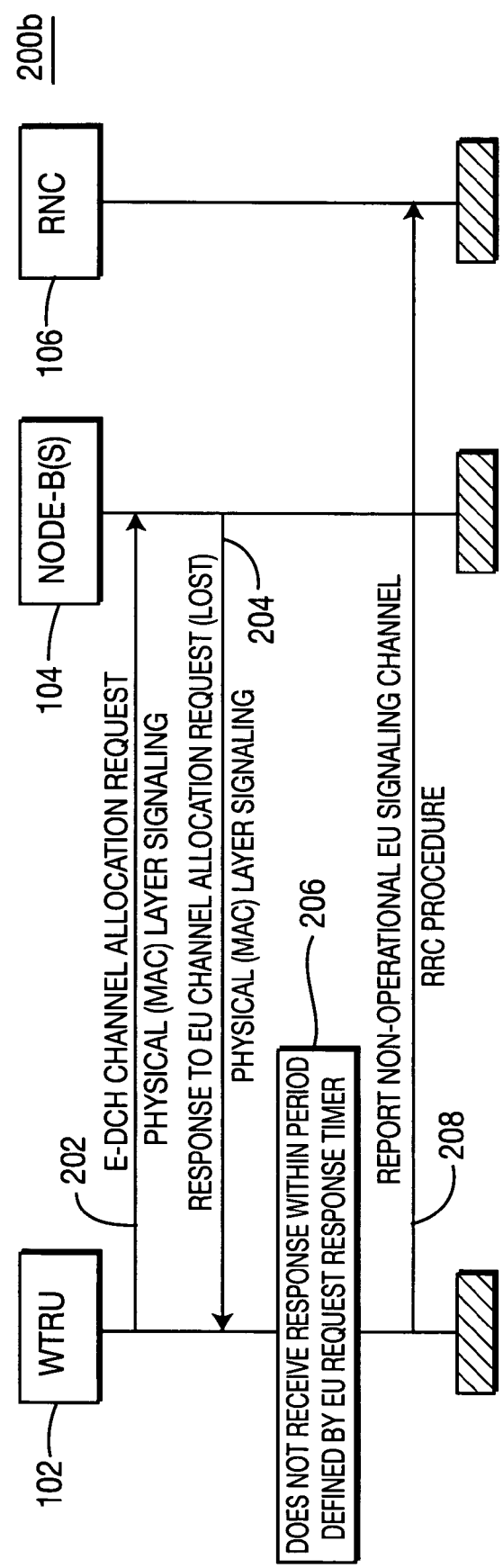
FIG. 2A
FIG. 2B

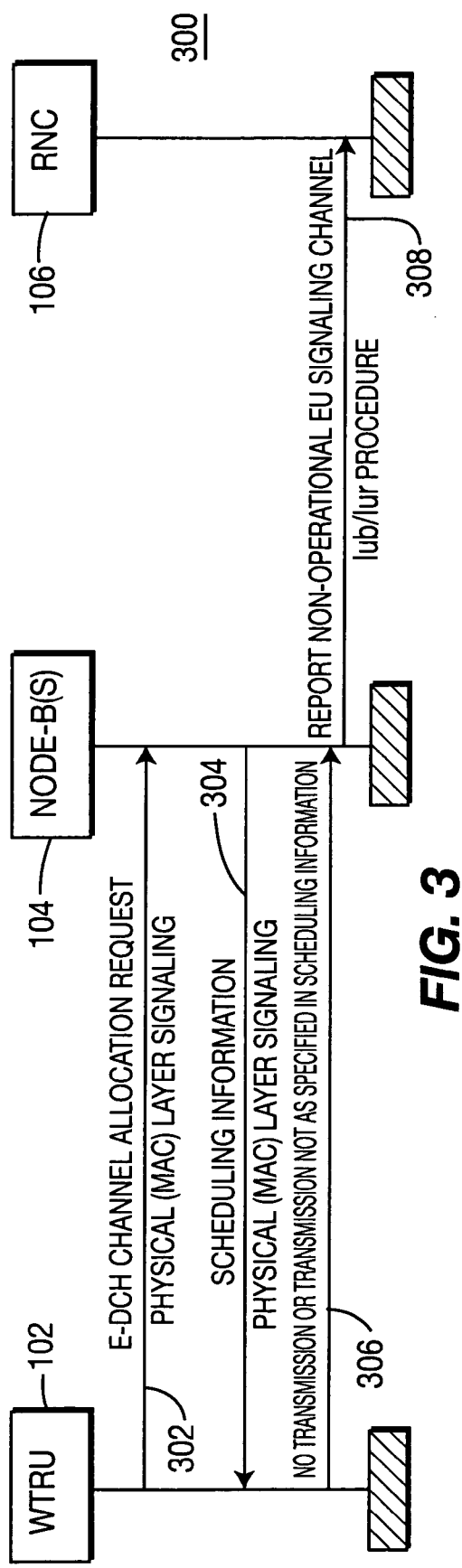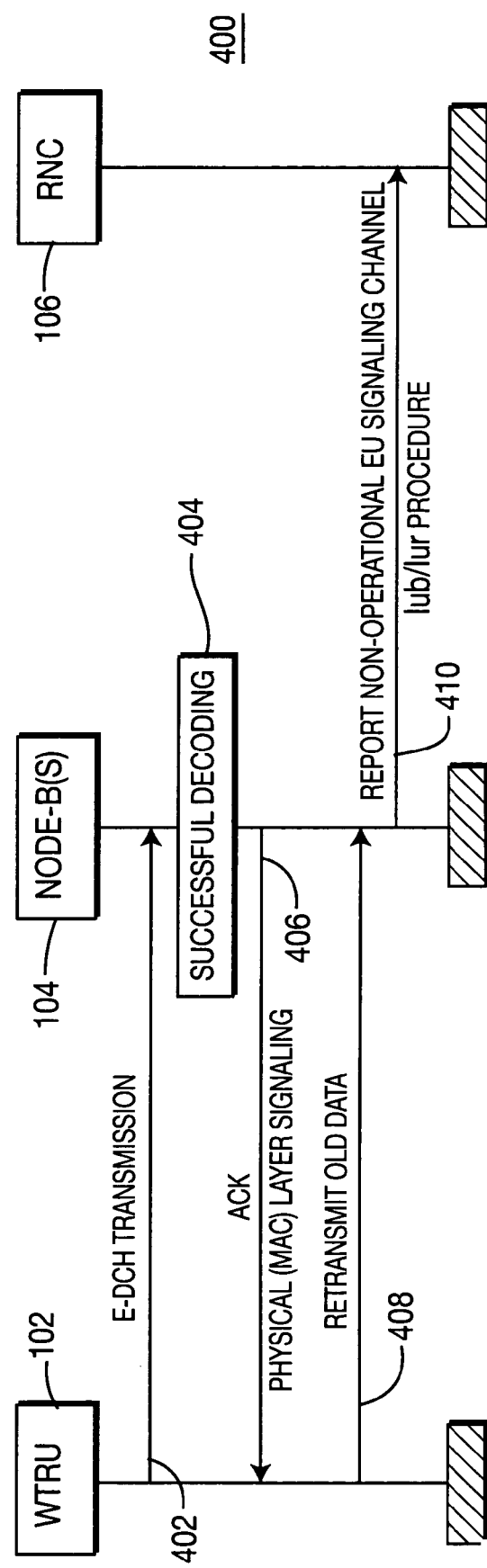

METHOD AND APPARATUS FOR IDENTIFYING AND REPORTING NON-OPERATIONAL ENHANCED UPLINK SIGNALING CHANNELS

CROSS REFERENCE TO RELATED APPLICATION

This application claims the benefit of U.S. Provisional Application No. 60/566,700 filed Apr. 30, 2004, which is incorporated by reference as if fully set forth.

FIELD OF INVENTION

The present invention is related to a wireless communication system including a wireless transmit/receive unit (WTRU), one or more Node-Bs and a radio network controller (RNC). More particularly, the present invention is a method and apparatus for identifying and reporting non-operational enhanced uplink (EU) signaling channels between the WTRU and the Node-B(s) used to transmit data via an enhanced dedicated channel (E-DCH) and to provide E-DCH data feedback information.

BACKGROUND

Methods for improving uplink (UL) coverage, throughput and transmission latency are being investigated in Release 6 (R6) of the 3rd Generation Partnership Project (3GPP). In order to successfully implement these methods, the scheduling and assigning of UL radio resources have been moved from an RNC to a Node-B such that the Node-B can make decisions and manage UL radio resources on a short-term basis more efficiently than the RNC, even if the RNC retains overall control over the Node-B.

In order for a WTRU to transmit data over an E-DCH, the WTRU needs to transmit E-DCH channel allocation requests to the Node-B via a UL EU signaling channel. Then, the Node-B determines the proper allocation of physical resources for the WTRU and transmits the scheduling information via the downlink (DL) EU signaling channel. After the radio resources are allocated to the WTRU, the WTRU transmits data through the E-DCH. The Node-B receives the data and determines success or failure of the E-DCH transmission. The Node-B signals the success or failure of the transmission to the WTRU through the DL EU signaling channel.

In order for the E-DCH to work properly, both UL and DL EU signaling channels have to be reliable. When either the UL or DL EU signaling channel is not working properly, it should be reported to the RNC to provide proper EU operation.

SUMMARY

The present invention is a method and apparatus for identifying and reporting a non-operational EU signaling channel. The present invention is implemented using a wireless communication system which includes a WTRU, one or more Node-Bs and an RNC. The WTRU sends a channel allocation request for E-DCH to the Node-B through a UL EU signaling channel. In response to the request, the Node-B sends a channel allocation to the WTRU through one or more DL EU signaling channels. The WTRU activates a request response timer when the WTRU sends the channel allocation request to the Node-B. If the WTRU does not receive channel allocation information from the Node-B before the request response timer expires, the WTRU reports a non-operational EU signaling channel to the RNC via the Node-B. If the Node-B does not receive an E-DCH data transmission after sending the channel allocation information, or an E-DCH data transmission is not received from the WTRU as specified in the channel allocation information, the Node-B reports a non-operational signaling channel to the RNC. The Node-B may report a non-operational EU signaling channel when the Node-B receives a subsequent E-DCH data transmission which is not consistent with the feedback information.

BRIEF DESCRIPTION OF THE DRAWINGS

A more detailed understanding of the invention may be had from the following description of a preferred embodiment, given by way of example and to be understood in conjunction with the accompanying drawing wherein:

FIGS. 2A and 2B are signaling flow diagrams of processes implemented by the system of FIG. 1 wherein the WTRU reports a non-operational EU signaling channel;

FIG. 3 is a signaling flow diagram of a process implemented by the system of FIG. 1 wherein the Node-B reports a non-operational EU signaling channel during initial channel allocation; and FIG. 4 is a signaling flow diagram of a process implemented by the system of FIG. 1 wherein the Node-B reports a non-operational EU signaling channel during a hybrid-automatic repeat request (H-ARQ) operation.

DETAILED DESCRIPTION OF THE PREFERRED EMBODIMENTS

Figure 1:
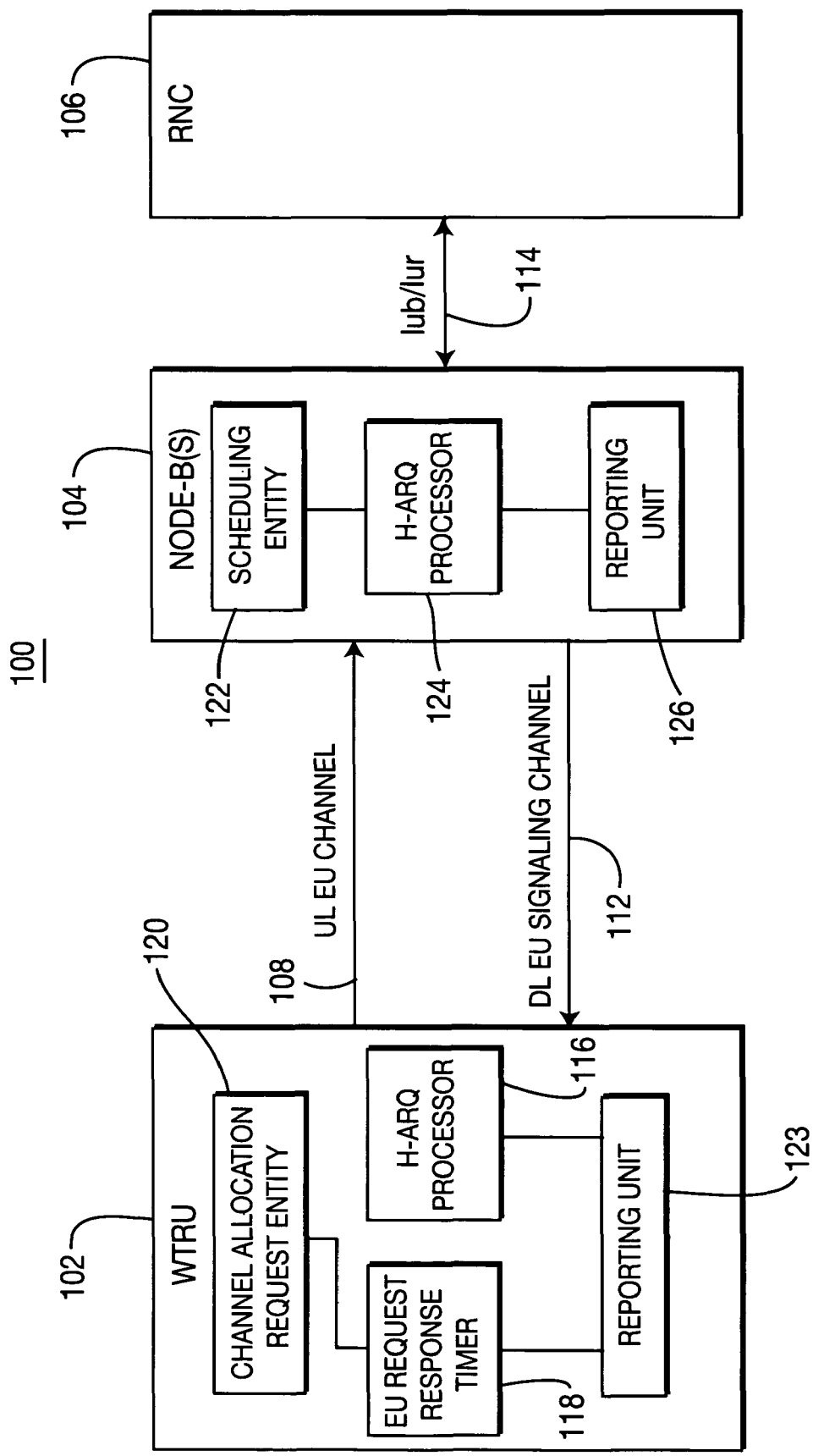
FIG. 1 is a block diagram of a wireless communication system operating in accordance with the present invention.

Hereafter, the terminology "WTRU" includes but is not limited to a user equipment (UE), a mobile station, a fixed or mobile subscriber unit, a pager, or any other type of device capable of operating in a wireless environment. When referred to hereafter, the terminology "Node-B" includes but is not limited to a base station, a site controller, an access point or any other type of interfacing device in a wireless environment.

The features of the present invention may be incorporated into an integrated circuit (IC) or be configured in a circuit comprising a multitude of interconnecting components.

FIG. 1 is a wireless communication system 100 in accordance with the present invention. The system 100 comprises a WTRU 102, one or more Node-B(s) 104 and an RNC 106. The WTRU includes an H-ARQ processor 116, an EU request response timer 118 a channel allocation request unit 120 and a reporting unit 123. The Node-B(s) includes an H-ARQ processor 124, a scheduling unit 122 and a reporting unit 126. The RNC 106 controls overall EU operation by configuring EU parameters for the Node-B(s) 104 and the WTRU 102 such as maximum allowed EU transmit power or available channel resources per Node-B. When the WTRU 102 has E-DCH data to be transmitted, the channel allocation request unit 120 of the WTRU 102 sends a E-DCH allocation request to the Node-B(s) 104 via a UL EU channel 108. The E-DCH allocation request may be sent via either an UL EU signaling channel, (i.e., enhanced dedicated physical control channel (E-DPCCH)), or an E-DCH. The UL EU channel 108 shown in FIG. 1 represents both the E-DPCCH and the E-DCH. In response, the scheduling entity 122 in the Node-B(s) 104 sends channel allocation information via one or more DL EU signaling channels 112. After EU radio resources are allocated for the WTRU 102, the WTRU 102 transmits the E-DCH data with H-ARQ processor 116 in the WTRU 102 via the UL EU channel 108 in accordance with the channel allocation information provided by the Node-B(s) 104. The Node-B(s) 104 receives the E-DCH data and the H-ARQ processor 124 in the Node-B(s) 104 sends E-DCH data feedback information via the DL EU signaling channel(s) 112. Both the WTRU 102 and the Node-B(s) 104 identify a non-operational signaling channel, and report it to the RNC 106. The Node-B(s) 104 sends a message identifying a non-operational signaling channel via the Iub/Iur 114. The WTRU 102 sends a message identifying a non-operational signaling channel over an air interface to the Node-B(s) 104 before the message is forwarded to the RNC 106 via the Iub/Iur 114.

FIGS. 2A and 2B are signaling flow diagrams of processes 200a and 200b which may occur between the WTRU 102 and the Node-B(s) 104 of the system 100, wherein the WTRU 102 reports a non-operational EU signaling channel to the RNC 106 via the Node-B 104. In each process 200a and 200b, the WTRU 102 transmits an E-DCH channel allocation request to the Node-B 104 (step 202). The channel allocation request may be a physical layer or media access control (MAC) layer signaling.

Upon sending the E-DCH allocation request to the Node-B(s) 104, the WTRU 102 activates the EU request response timer 118 to establish a time period during which the WTRU 102 is expected or required to receive channel allocation information, (i.e., scheduling information), from the Node-B(s) 104.

In both of the processes 200a and 200b, the WTRU 102 fails to receive channel allocation information within the time period defined by the EU request response timer 118 (step 206). When the WTRU 102 fails to receive channel allocation information before the timer 118 expires, there are two possibilities. First, as illustrated by FIG. 2A, a transmission failure may occur on the UL EU channel 108, (i.e., either E-DPCCH or E-DCH), such that the Node-B 104 cannot receive the E-DCH allocation request from the WTRU 102. Second, as illustrated by FIG. 2B, a transmission failure may occur on the DL EU signaling channel 112. Although the Node-B 104 has received the E-DCH allocation request from the WTRU 102 and sends a response, the response is not delivered successfully to the WTRU 102 because of the failure on the DL EU signaling channel 112.

In FIG. 2A, for some reason, the E-DCH allocation request was not successfully delivered to the Node-B 104 (step 202). Therefore, the Node-B 104 does not send channel allocation information in response to the E-DCH allocation request. The WTRU 102 does not receive channel allocation information by the time the EU request response timer 118 expires (step 206). At that point, the reporting unit 123 in the WTRU 102 recognizes that the EU signaling channel is not properly operating and reports it to the RNC 106 through one or more radio resource control (RRC) procedures (step 208).

In FIG. 2B, the Node-B 104 receives the E-DCH allocation request (step 202) and sends channel allocation information to the WTRU 102 (step 204). However, the channel allocation information was not successfully delivered to the WTRU 102 by the time the EU request response timer 118 expires (step 206). At that point, the WTRU 102 recognizes that the EU signaling channel is not properly operating and the reporting unit 123 reports it to the RNC 106 through one or more RRC procedures (step 208).

Since there is no easy way for the WTRU 102 to determine whether a UL or DL EU signaling channel transmission has failed, the WTRU 102 regards EU signaling as non-operational without distinguishing between the UL and DL. The WTRU 102 reports the non-operational EU signaling channel without specifying UL or DL to the RNC 106.

The report of a non-operational EU signaling channel may be based on reaching a statistical threshold of failures, rather than reporting individual failure. The WTRU may repeat steps 202 in process 200a and steps 202 and 204 in process 200b before sending a report of non-operational EU signaling channel to the RNC. In other words, the WTRU 102 may send a report only than a predetermined number of failures occur.

After receiving the report from the WTRU 102, the RNC 106 takes a corrective measure, such as increasing transmit power for the UL and/or DL signaling channels.

FIG. 3 is a signaling flow diagram of a process 300 between the components of the system 100 wherein the Node-B 104 reports a non-operational EU signaling channel during initial channel allocation in accordance with the present invention. The WTRU 102 transmits an E-DCH allocation request to the Node-B 104 (step 302). The Node-B 104 receives the E-DCH allocation request successfully and sends channel allocation information to the WTRU 102 (step 304). However, the channel allocation information was not successfully delivered to the WTRU 102 before the EU request response timer 118 expires. This may have resulted from the Node-B 104 not receiving E-DCH transmissions from the WTRU 102 after the channel allocation information is sent, or the Node-B 104 receiving E-DCH transmissions that are not as specified in the channel allocation information. For example, the channel allocation information specifies the WTRU's EU transmission data rate, persistence level or the like. If the WTRU's actual transmission does not follow the channel allocation information, the Node-B 104 then recognizes that an EU signaling channel is non-operational (step 306). The reporting unit 126 in the Node-B 104 then reports the non-operational EU signaling channel to the RNC 106 via one or more Iub/Iur procedures 114 (step 308). The RNC 106 may then take corrective action such as by increasing the transmit power of the DL EU signaling channel and/or the UL EU signaling channel.

The Node-B 104 may identify and report a non-operational signaling channel based on reaching a statistical threshold of failures, rather than reporting an individual failure.

FIG. 4 is a signaling flow diagram of a process 400 between the components of the system 100 wherein the Node-B 104 reports a non-operational EU signaling channel during H-ARQ operation in accordance with the present invention. After E-DCH channel allocation is completed, the WTRU 102 transmits E-DCH data via the UL EU channel 108 (step 402). The Node-B 104 receives the E-DCH transmission and decodes the data (step 404). After decoding the data, the Node-B 104 transmits feedback information depending on the success or failure of decoding the data (step 406). If the Node-B 104 successfully decodes the data, the Node-B 104 transmits an acknowledgement (ACK) message, and if the Node-B 104 fails to decode the data, the Node-B 104 transmits a non-acknowledgement (NACK) message. The feedback information may be either physical or MAC layer signaling.

After transmitting the feedback information, if the Node-B 104 receives subsequent E-DCH transmissions which are not consistent to the feedback information (step 408), the Node-B 104 recognizes that the EU signaling channel is non-operational. For example, as shown in FIG. 4, when the Node-B 104 sends an ACK message in step 406, but receives the same old data again from the WTRU 102 in step 408, it means either the feedback information was not successfully delivered to the WTRU 102 or the ACK message was misinterpreted as a NACK message. The reporting unit 126 of the Node-B 104 then reports a non-operational EU signaling channel to the RNC 106 via one or more Iub/Iur procedures 114 (step 410). The RNC 106 may then initiate a corrective action.

The Node-B 104 may identify and report a non-operational signaling channel based on reaching a statistical threshold of failures, rather than reporting an individual failure.

Although the features and elements of the present invention are described in the preferred embodiments in particular combinations, each feature or element can be used alone without the other features and elements of the preferred embodiments or in various combinations with or without other features and elements of the present invention.

While the present invention has been described in terms of the preferred embodiment, other variations which are within the scope of the invention as outlined in the claims below will be apparent to those skilled in the art.

What is claimed is:

1. A method for reporting a non-operational enhanced uplink (EU) signaling channel, the method comprising:
   receiving a channel allocation request;
   starting a response timer set to expire within a predefined time period;
   sending channel allocation information from a first entity to a second entity in response to the channel allocation request; and
   reporting a non-operational EU signaling channel from the first entity to a third entity if an enhanced dedicated channel (E-DCH) data is not received within the predefined time period after sending the channel allocation information.

2. The method of claim 1 further comprising:
   reporting a non-operational EU signaling channel when an E-DCH data transmission is received which is inconsistent from the channel allocation information.

3. A method for reporting a non-operational enhanced uplink (EU) signaling channel, the method comprising:
   receiving enhanced dedicated channel (E-DCH) data;
   sending feedback information from a first entity to a second entity in response to the E-DCH data; and
   reporting a non-operational EU signaling channel from the first entity to a third entity when subsequently received E-DCH data is not consistent with the feedback information.

4. The method of claim 3 wherein the feedback information is an acknowledgement (ACK) message and a non-operational EU signaling channel is reported when previously transmitted E-DCH data is received subsequently.

5. The method of claim 3 wherein the feedback information is a non-acknowledgement (NACK) message and a non-operational EU signaling channel is reported when new E-DCH data is received subsequently.

6. The method of claim 3 wherein the non-operational EU signaling channel is reported when statistics of non-operation exceed a predetermined threshold.

7. A Node-B that reports a non-operational enhanced uplink (EU) signaling channel, the Node-B comprising:
   a scheduling unit for receiving a channel allocation request and sending channel allocation information in response to the channel allocation request; and
   a reporting unit for reporting a non-operational EU signaling channel to a radio network controller if an enhanced dedicated channel (E-DCH) data is not received after sending the channel allocation information.

8. The Node-B of claim 7 wherein the reporting unit reports a non-operational EU signaling channel when the Node-B receives an E-DCH transmission which is inconsistent with the channel allocation information.

\* \* \* \* \*